Dec. 23, 1969  E. G. EICHLER  3,485,318
ACOUSTIC RECEIVER FOR MINIMIZING FLOW NOISE
Filed May 24, 1968
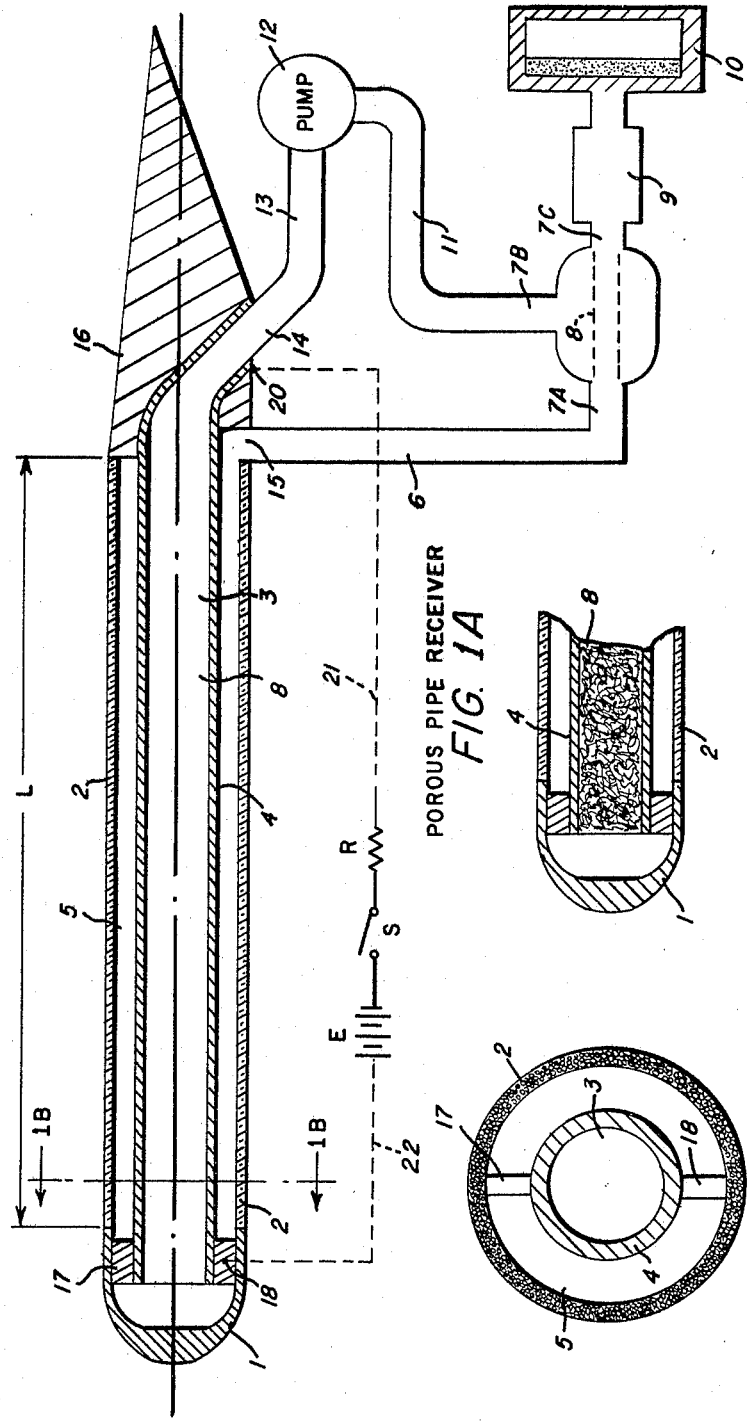
INVENTOR
EWALD EICHLER
BY Robert Bruce Brodie
ATTORNEY

United States Patent Office

3,485,318
Patented Dec. 23, 1969

3,485,318
ACOUSTIC RECEIVER FOR MINIMIZING FLOW NOISE
Ewald G. Eichler, Cambridge, Mass., assignor to Raytheon Company, Lexington, Mass., a corporation of Delaware
Filed May 24, 1968, Ser. No. 731,904
Int. Cl. G01v 1/20
U.S. Cl. 181—.5        5 Claims

ABSTRACT OF THE DISCLOSURE

An acoustic receiver for minimizing flow noise comprising a rigid thin-walled porous pipe having a diameter less than ½ the acoustic wavelength of interest, the porous pipe length being not small in relation to the wavelength of interest. The receiver further comprises means terminating one end of the porous pipe for absorbing traveling acoustic waves, and a transducer terminating the other end of the pipe. The directivity pattern of the acoustic receiver moving at high velocity through the medium is maintained either through the circulaiton of an appropriate gas mixture interior to the porous pipe or through electrical heating.

---

The invention herein described was made in the course of or under a contract or subcontract thereunder, with the Department of Defense.

BACKGROUND OF THE INVENTION

This invention relates to acoustic receivers for imnimizing flow noise, and more particularly, to acoustic receivers moving at a high velocity through a surrounding acoustic medium.

When any acoustic receiver, such as a microphone, moves through an acoustic medium, such as air, the movement of the air or wind will produce an electrical output at the transducer. There are at least three types of noise generated when an acoustic receiver moves through the medium. First, there is local noise due to atmospheric turbulence or inhomogeneity. Second, there is local noise arising from the turbulent boundary layer between the medium and the receiver. Lastly, there exists radiated flow noise.

Among the conventional means for reducing flow noise are wind screens and streamlined caps for otherwise conventional microphones. The traditional wind screens as, for example, shown in U.S. Patent 3,154,171 achieve only moderate reductions of flow noise because they are bulky and substantially disturb the flow. Such screens are unsuitable for high velocity operation because they are constructed from polycellular porous material, such as urethane, which tends to fly apart. Streamlined caps fail to reduce the flow noise that still exists in spite of the streamlining.

Flow noise has been reduced at extremely low frequencies through the use of a multi-port line receiver as is set forth in U.S. Patent 2,789,651. It is also known that characteristics of directionality of reception can be applied to reduce the general background noise with reference to the signal. An illustrated example of multi-port line receiver, which combines the use of a wind screen and is directional, is set forth in U.S. Patents 3,265,153 and 3,236,328.

It is accordingly an object of this invention to devise an acoustic receiver which minimizes flow noise especially for high velocity operation.

It is yet another object of this invention to devise an acoustic receiver for minimizing flow noise which retains structural simplicity and compactness in a streamlined configuration.

SUMMARY OF THE INVENTION

The foregoing objects of this invention are satisfied by an embodiment comprising a rigid thin-walled porous pipe having a diameter less than ½ the acoustic wavelength of interest, the porous pipe length being not small in relation to the wavelength of interest. Means terminate one end of the pipe for absorbing traveling acoustic waves, while transducing means terminate the other end of the porous pipe.

In the intended acoustic environment, an acoustic signal and flow noise manifest themselves across the porous pipe outer surface in the form of fluctuating pressures. A proprotional in-flow or out-flow of the acoustic medium is transferred through the elements of the porous wall. This, in turn, causes acoustic waves to be set up inside the porous pipe. Significantly, the wave elements combine to form two waves. One wave travels towards the front end and one wave travels towards the rear end of the porous pipe. The acoustic absorber absorbs the wave traveling towards the front end. The wave traveling towards the rear is presented to the transducer. The absorption of the acoustic wave traveling towards the front end avoids otherwise interfering reflectances.

The noise elements of the wave traveling to the rear end of the porous pipe tend to interfere more or less destructively. The effect then is to reduce the flow noise and the general background noise. The noise diminution results in an overall improvement of the signal-to-noise ratio.

In order to assist in high velocity operation through structural compactness, the means for absorbing traveling waves can be formed from a pipe or duct spaced within the porous pipe, and acoustically communicating with front end of the pipe. If sound absorbing material is placed in the section of the length along at least ¼ of the acoustic wavelength of interest, then substantial broad-band absorption will result.

At high velocity operation the directivity pattern of the acoustic receiver deteriorates. This alteration in the directivity pattern may be prevented if an appropriate gas mixture is circulated interior to the porous pipe or if the interior gas is heated by, for example, a suitable electrical means.

BRIEF DESCRIPTION OF THE DRAWINGS

FIG. 1A shows a sectioned elevation view of the porous pipe acoustic receiver;
FIG. 1B shows a cross-section view along the cut 1B of the receiver emphasizing the spatial relationship between the interior tube used for sound absorption and the porous pipe;
FIG. 1C shows the interior pipe or duct filled with porous sound absorbing material.

DESCRIPTION OF THE PREFERRED EMBODIMENT

In FIG 1A a rigid thin-walled porous pipe 2 having length L is shown terminated at one end by an end piece 1. A non-porous inner duct 4 supported by members 17 and 18 acoustically communicates with the porous pipe interior 5 through the interior defined by the end piece 1. The interior of duct 4 may be filled with suitable sound absorbing material, such as fiberglass, along at least ¼ of the acoustic wavelength of interest. A streamlined end piece 16 terminates the other end of the porous pipe.

Where high velocity operation is not involved a transducer 10 may, for example, be placed across the opening 15. Also, under this circumstance, opening 14 could otherwise be suitably terminated.

The porous pipe may be cylindrically shaped and have a length of approximately 12 inches with a wall thickness of ⅟₃₂ inch and an outside diameter of 1 inch. A favorable specific flow resistance of the porous pipe is in the range of 10 to 100 times the characteristic acoustic impedance of the medium (for air the acoustic impedance is taken at 420 kg./sec.-m.$^2$). The material comprising the rigid porous pipe may be from any sintered fine grain ceramic or metal. The other surface parts, such as elements 1 and 16, as well as interior duct 4, may be formed from non-porous rigid material.

For best performance, the pores in the porous pipe should be narrow to achieve both a relatively smooth outer surface and a relatively high flow resistance for medium flow through the wall. The acoustic signal and noise present in the form of fluctuating pressures is distributed across the porous pipe 2 outer surface. These varying pressures cause proportional in-flow or out-flow of the medium through the pores of the pipe. The flow of the medium causes acoustic waves to travel inside the pipe. The wave elements combine to form two waves. One wave travels towards the front and one wave travels towards the rear of the porous pipe. The wave traveling towards the front is absorbed by acoustic absorbing material found in interior duct 4. The wave traveling towards the rear is presented to transducer 10 which optionally may be placed at aperture 15. As a result of the interaction between the structure of this embodiment and the medium, the induced internal acoustic wave comprises signal components which reinforce each other and noise components which cancel each other.

At high velocities, the directivity pattern of the acoustic receiver deteriorates. It has been discovered that such directivity deterioration may be reduced if a suitable gas mixture, such as helium and air, is circulated under pressure through the pipe interior. In this regard, attention is directed to FIG. 1B which shows the duct 4 spaced within porous pipe 2. It should also be noted that supports 17 and 18 permit air flow in the passage between duct 4 and pipe 2.

A gas circulation path may be defined through connector 13 coupling the interior of duct 4 at aperture 14, the interior space formed by end piece 1, and the interior space 5 communicating therewith. Interior space 5 is connected to conduit 6 through aperture 15. The return path is finally closed through conduit 11 and transfer element 7 intercoupling conduit 6 and pump 12. Transducer 10 may be suitably connected to transfer element 7 through conduit 9. Acoustic variations through interior 5 over conduit 6 communicate with transducer 10 if a perforated element 8 is connected between ports 7A and 7C of transfer element 7. This perforated element permits gas flow or circulation on one hand while maintaining acoustic communication to transducer 10.

Circulation may be assisted if a thin film lining made from Mylar plastic film of approximately ½ mil thickness is placed on the inside wall of the porous pipe.

It is desirable that the porous wall interior be previously roughened with sand paper to permit the film to be held in place either by adhesive sealing along the edges or by atmospheric over pressure inside the porous pipe produced by pump 12. The same gas flow, or part of it, can also be used as bias flow for transducer 10.

For the optional electrical heating a current may be introduced at the support elements 17 or 18 with the path being defined by the duct 4 and electrical terminal 20, conductor 4, energy source E, resistance R, and conductor 22.

For purposes of completeness FIG. 1C is a sectioned view of the receiver shown in FIG. 1A in which the acoustic absorbing material, such as fiberglass, has been inserted in duct 4 along a portion of its extent.

In summary, it has been shown that a thin-walled porous rigid pipe having a diameter less than the acoustic wavelength of interest and the porous pipe length will set up two oppositely directed acoustic traveling waves in response to an external incident acoustic wave upon the pipe. One of the traveling waves is absorbed by a suitable acoustic impedance. The other of the traveling acoustic waves is made incident upon an appropriately terminated transducer. As a consequence of the porosity of the pipe, signal elements reinforce each other while noise elements tend to cancel. The deterioration of the directivity pattern of the receiver usually associated with high velocity operation is reduced either by the circulation of an appropriate gas mixture under pressure through the pipe interior or by the electrical heating of the pipe interior.

I claim:
1. An acoustic receiver for minimizing flow noise comprising:
   a rigid thin-walled porous pipe having a diameter less than ½ the acoustic wavelength of interest, the porous pipe length being not small in relation to the wavelength of interest;
   means terminating one end of the porous pipe for absorbing traveling acoustic waves;
   means for electrically heating the porous pipe interior; and
   transducing means terminating the other end of the porous pipe.

2. An acoustic receiver for minimizing flow noise between the receiver and an acoustic medium comprising:
   a thin-walled rigid porous pipe having a diameter less than ½ the acoustic wavelength of interest, the porous pipe length being not small in relation to the wavelength of interest, the pipe having a specific flow resistance in the range between 10 to 100 times the characteristic acoustic impedance of the medium;
   an acoustic absorber including a duct coupling one terminal of the porous pipe and having a diameter sufficiently small to be contained within the porous pipe, the duct having an acoustic absorbent structure of a length at least equal to ¼ of the acoustic wavelength of interest;
   means for circulating a helium-air mixture through a path including the duct and the porous pipe interior; and
   transducing means coupling the other terminal of the porous pipe and including means acoustically communicating with the interior space defined by the porous pipe interior and the duct exterior.

3. An acoustic receiver for minimizing flow noise comprising:
   a rigid thin-walled porous pipe having a diamter less than ½ the acoustic wavelength of interest, the porous pipe length being not small in relation to the wavelength of interest;
   means terminating one end of the porous pipe for absorbing traveling acoustic waves;
   means, including a film lining adjacent to the interior porous pipe wall maintained in place by slight atmospheric over-pressure, for circulating a gas mixture inside the porous pipe; and
   transducing means terminating the other end of the porous pipe.

4. An acoustic receiver according to claim 3 characterized in that the gas mixture is formed from helium and air.

5. An acoustic receiver for minimizing flow noise between the receiver and an acoustic medium comprising:
   a thin-walled rigid porous pipe having a diameter less than ½ the acoustic wavelength of interest, the porous pipe length being not small in relation to the wavelength of interest, the pipe having a specific flow resistance in the range between 10 to 100 times the characteristic acoustic impedance of the medium;
   an acoustic absorber including a duct coupling one terminal of the porous pipe and having a diameter sufficiently small to be contained within the porous pipe, the duct having an acoustic absorbent structure of a length at least equal to ¼ of the acoustic wavelength of interest;

means for electrically heating the porous pipe interior; and transducing means coupling the other terminal of the porous pipe and including means acoustically communicating with the interior space defined by the porous pipe interior and the duct exterior.

References Cited

UNITED STATES PATENTS 2,808,584  10/1957  Kock _____ 181—0.5

RODNEY D. BENNETT, JR., Primary Examiner
CHARLES E. WANDS, Assistant Examiner